United States Patent [19]

Worschech et al.

[11] Patent Number: 5,232,967
[45] Date of Patent: Aug. 3, 1993

[54] LUBRICANTS FOR THERMOPLASTIC PLASTICS

[75] Inventors: Kurt Worschech, Loxstedt; Erwin Fleischer, Bremerhaven-Spaden; Peter Wedl, Loxstedt; Frido Loeffelholz, Bremerhaven-Surheide; Udo E. Brand, Bremerhaven-Wulsdorf, all of Fed. Rep. of Germany

[73] Assignee: Henkel Kommanditgesellschaft auf Aktien, Duesseldorf-Holthausen, Fed. Rep. of Germany

[21] Appl. No.: 95,296

[22] Filed: Sep. 10, 1987

[30] Foreign Application Priority Data

Sep. 10, 1986 [DE] Fed. Rep. of Germany ....... 3630783

[51] Int. Cl.$^5$ ............................................. C08K 5/10
[52] U.S. Cl. ..................................... 524/310; 524/314
[58] Field of Search ................................. 524/310, 314

[56] References Cited

U.S. PATENT DOCUMENTS 4,202,806  5/1980  Yoshida ........................... 524/310
4,218,352  8/1980  Takeuchi ......................... 524/310

FOREIGN PATENT DOCUMENTS 1907768   6/1971  Fed. Rep. of Germany .
2306744   8/1974  Fed. Rep. of Germany .
1292548  12/1971  United Kingdom .

Primary Examiner—Joseph L. Schofer
Assistant Examiner—Peter D. Mulcahy
Attorney, Agent, or Firm—Ernest G. Szoke; Wayne C. Jaeschke; Henry E. Millson, Jr.

[57] ABSTRACT

Mixed esters comprising the reaction product of
a) an aliphatic, cycloaliphatic and/or aromatic $C_2$–$C_{22}$-dicarboxylic acid containing up to 2 hydroxyl groups, or a mixture thereof;
b) an aliphatic polyol containing from 3 to 6 hydroxyl groups or a mixture thereof; and
c) an aliphatic $C_2$–$C_{32}$-monocarboxylic acid containing up to 2 hydroxyl groups, or a mixture thereof;
wherein the molar ratio of components a) and b) is approximately $n-1$:n, wherein n is an integer of from 6 to 15, and component c) is selected so that at least one free hydroxyl group is present per molecule of the mixed ester, are useful as lubricants for the molding of thermoplastic plastics, especially polyvinyl chloride homopolymers or copolymers.

8 Claims, No Drawings

LUBRICANTS FOR THERMOPLASTIC PLASTICS

BACKGROUND OF THE INVENTION

1. Field of the Invention

In the production of plasticizer-free films of polyvinyl chloride (PVC) by the calender process, lubricants are required which are good release agents and which provide for safe removal of the hot films from the calender roll. Preferably, the lubricants employed are useful as release agents for both normal, unmodified polyvinyl chloride molding compositions and also for high-impact, modified polyvinyl chloride molding compositions. The releasing effect required presupposes a certain incompatibility between the lubricant and the polyvinyl chloride to enable the lubricant to be concentrated at the surface of the film; this incompatibility ideally should not affect film quality, particularly film light-transmitting properties. Glass-clear articles should be able to be produced, even when relatively large quantities of lubricant are used, as is typically the case in the production of very thin films. In many cases, however, it is not possible optimally to satisfy both requirements. In the interests of the necessary release effect, compromises are often made to the detriment of the transparency of the product.

2. Discussion of Related Art

Known lubricants useful in the production of unplasticized PVC films include montan waxes and substantially neutral mixed esters of aliphatic, cycloaliphatic or aromatic $C_2$–$C_{22}$-dicarboxylic acids, aliphatic $C_2$–$C_6$-polyols and aliphatic $C_{12}$–$C_{30}$-monocarboxylic acids having hydroxyl or acid numbers of from 0 to 6 (German patent application 19 07 768), and also substantially neutral mixed esters of aliphatic diols, aliphatic, cycloaliphatic or aromatic polycarboxylic acids containing from 2 to 6 carboxyl groups and aliphatic monofunctional alcohols containing from 12 to 30 carbon atoms (German patent application 23 06 744). Montan waxes have the disadvantage that, even in small quantities, they cause serious hazing in unmodified polyvinyl chloride films. In modified polyvinyl chloride, montan waxes are generally too readily soluble so that their release effect is unsatisfactory. The known mixed esters described in the art are attended by the disadvantage that, even in small quantities, they cause relatively serious hazing in modified polyvinyl chloride.

BRIEF DESCRIPTION OF THE INVENTION

The present invention accordingly provides new lubricants for thermoplastic compositions which are free from the aforementioned disadvantages. More particularly, the invention provides lubricants for PVC films which are effective release agents even in small quantities, and which are sufficiently compatible with polyvinyl chloride so that hazing or other reduction in transparency of the films is substantially avoided, both in unmodified PVC compositions and also in high-impact modified PVC compositions, especially high-impact compositions.

The invention is predicated on the discovery that hydroxyl-group-containing mixed esters of aliphatic, cycloaliphatic and/or aromatic dicarboxylic acids, aliphatic polyols, and aliphatic monocarboxylic acids, wherein the ester contains at least one free hydroxyl group in the molecule per molecule of mixed ester, are effective external lubricants for thermoplastic materials, especially for the production of PVC films of good transparency.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The present invention relates to mixed esters, useful as lubricants for thermoplastic plastics, comprising the reaction product of a) an aliphatic, cycloaliphatic, or aromatic $C_2$–$C_{22}$ dicarboxylic acid containing up to 2 hydroxyl groups, or a mixture thereof;

b) an aliphatic polyol containing from 3 to 6 hydroxyl groups, or a mixture thereof; and c) an aliphatic $C_2$–$C_{32}$-monocarboxylic acid containing up to 2 hydroxyl groups, or a mixture thereof;

in which the molar ratio of components a) and b) is approximately n−1:n, wherein n is an integer of from 6 to 15, and component c) is selected with respect to both amount and functional group content so that, on average, at least one free hydroxyl group is present per molecule mixed ester.

Mixed esters in which the reactants are selected to provide a molar ratio of free hydroxyl groups to dicarboxylic acid residues present in the product of from 1:1 to 1:7 are particularly suitable in many applications.

The reactants may be saturated or unsaturated, and contain substituents other than hydroxyl which do not compromise the quality of the lubricated plastic, or the release effectiveness of the lubricant. The following compounds are exemplary of starting materials useful for the production of lubricants according to the invention:

Suitable aliphatic, cycloaliphatic or aromatic dicarboxylic acids [component (a)] include oxalic acid, malonic acid, succinic acid, glutaric acid, adipic acid, pimelic acid, suberic acid, azelaic acid, sebacic acid, nonane dicarboxylic acid, decane dicarboxylic acid, undecane dicarboxylic acid, dodecane dicarboxylic acid, eicosane dicarboxylic acid, maleic acid, fumaric acid, citraconic acid, mesaconic acid, itaconic acid, cyclopropane dicarboxylic acid, cyclobutane dicarboxylic acid, cyclopentadiene dicarboxylic acid, camphor acid, hexahydrophthalic acid, phthalic acid, terephthalic acid, isophthalic acid, naphthalic acid and diphenyl-o,o'-dicarboxylic acid. Suitable dicarboxylic acids substituted by 1 or 2 hydroxyl groups are, in particular, tartronic acid, hydroxysuccinic acid, and tartaric acid.

The following exemplary compounds are suitable as the polyol component (b) for the production of mixed esters according to the invention: glycerol, trimethylolpropane, erythritol, pentaerythritol, diglycerol, ditrimethylolpropane, dipentaerythritol, xylitol, mannitol, and sorbitol.

The following exemplary compounds are suitable as the monocarboxylic acid component (c) for the production of the mixed esters according to the invention: lauric acid, myristic acid, palmitic acid, margaric acid, stearic acid, arachic acid, behenic acid, lignoceric acid, cerotic acid, montanic acid, oleic acid, elaidic acid, arachidonic acid, erucic acid, linoleic acid and linolenic acid, as well as mixtures of these acids, particularly those mixtures of the type obtainable from natural fats and oils. Suitable monocarboxylic acids substituted by 1 or 2 hydroxyl groups are, for example, lactic acid, dimethylolpropionic acid (2,2-dihydroxymethyl propionic acid), 10-hydroxystearic acid, 12-hydroxystearic acid, 9,10-dihydroxystearic acid and ricinoleic acid.

The mixed esters according to the invention are obtained by known methods of organic synthesis. The free hydroxyl groups present in the mixed ester product are derived from the polyol reactant, from one or more of the hydroxydicarboxylic acid coreactants, and/or from one or more of the hydroxymonocarboxylic acid coreactants.

The mixed esters according to the invention are produced by textbook esterification processes, optionally using suitable known esterification catalysts, such as tin powder. The esterification process generally comprises several steps, with the order depending upon the stoichiometry envisaged for the particular mixed ester. In this connection, it is particularly important to proceed so that hydroxyl groups introduced into the molecule through hydroxydicarboxylic or hydroxymonocarboxylic acids remain unesterified. It is only in cases where the free hydroxyl groups of the mixed ester molecule are derived solely from the polyol reactant that it is practicable to carry out the synthesis as a one-step process, by simultaneous esterification of the polyol with both the dicarboxylic acid reactant and the monocarboxylic acid reactant. However, in the case wherein the hydroxyl is derived solely or partly from the acid reactants (a) and (c), the mixed esters of the invention are synthesized by a two-step process, which is also the preferred method even when the mixed ester free hydroxyl groups are derived solely from the polyol reactant. A useful two-step process comprises initially reacting the dicarboxylic acid reactant and the polyol reactant in the total quantities selected until the acid number of the product is substantially zero, and then effecting esterification with the proposed quantity of monocarboxylic acid, again until the acid number of the product has fallen to zero. Alternatively, the polyol and the monocarboxylic acid, each in the total quantities selected, are esterified with one another in the first step until the acid number of the reaction mixture is substantially zero. In the second step, the intermediate product thus obtained is esterified with the calculated quantity of dicarboxylic acid until the acid number has fallen to approximately zero.

For the production of mixed esters in which the free hydroxyl groups derive completely or partly from a hydroxydicarboxylic acid, the polyol and monocarboxylic acid are conveniently reacted as in the alternate process described supra, and, instead of the dicarboxylic acid employed in the second step, a hydroxydicarboxylic acid or a dicarboxylic acid/hydroxydicarboxylic acid mixture is used. In this particular case (employing a mixture of dicarboxylic and hydroxydicarboxylic acids), the intermediate product obtained from the polyol and the monocarboxylic acid is preferably reacted first with the dicarboxylic acid, and then with the hydroxydicarboxylic acid.

If desired, special effects are obtainable with mixed esters in which the free hydroxyl groups derive completely or partly from a hydroxymonocarboxylic acid. Mixed esters such as these are preferably prepared by esterifying the hydroxymonocarboxylic acids in a final synthesis step after preparation of an intermediate product synthesized from polyol, dicarboxylic acid, or a mixture of dicarboxylic and monocarboxylic acids.

The present invention also relates to the use of mixed esters according to the invention as lubricants for the molding of thermoplastic plastics, particularly unplasticized or plasticized polyvinyl chloride or copolymers predominantly containing vinyl chloride.

In practical application, the mixed esters for use as lubricants in accordance with the invention are added to polymer molding compositions before molding (the term "molding" herein broadly refers to any type of forming of the composition into a desired shape, including calendering). The quantity added depends upon the composition to be lubricated and generally ranges from 0.1 to 2 parts by weight, usually preferably from 0.2 to 1 part by weight, per 100 parts by weight polymer. After the lubricant has been substantially homogeneously distributed in the molding compositions, molding may proceed.

The lubricant effect of the hydroxyl-group-containing mixed esters according to the invention is particularly useful in the molding of thermoplastic polymers of which the principal constituent (more than 50%) is vinyl chloride. Of particular importance in this regard are homopolymers of vinyl chloride having K-values of from 57 to 65, and preferably of from 60 to 62, which have been obtained by suspension or mass polymerization. Mixtures of PVC obtained by suspension or mass polymerization techniques with emulsion PVC are also useful. It is especially contemplated to use vinyl chloride copolymers containing at least 75% by weight vinyl chloride, and the balance other polymerizable monomers, such as vinyl esters, particularly vinyl acetate; methacrylates, particularly methyl and butyl methacrylate; fumaric acid esters or free fumaric acid; or crotonic acid in small quantities (e.g., less than about 5% by weight); and also vinylidene chloride. The mixed esters of the invention are particularly useful in lubricating unplasticized PVC compositions, especially compositions for the production of calendered films.

The invention further relates to molding compositions based on thermoplastic plastics, more especially polyvinyl chloride or the previously described vinyl chloride copolymers predominantly containing vinyl chloride, characterized by the use of the mixed esters of the invention as lubricants in quantities of from 0.1 to 2 parts by weight to 100 parts by weight polymer.

The molding compositions, in addition to the thermoplastic plastics, additionally comprise standard auxiliaries such as flow modifiers, such as flow modifiers base on methacrylat polymers; high impact modifiers, such as high impact modifiers based on methacrylate/butadiene/styrene copolymers; stabilizers, such as dialkyl tin mercaptides; and additional lubricants, preferably internal lubricants, such as glycerol dioleate. The new lubricants provide a good release effect both in unmodified and in high-impact polyvinyl chloride molding compositions, so that relatively small amounts are sufficient to obtain the desired release effect. The new products are so compatible with the PVC mixtures in the quantities required to obtain a satisfactory release effect that unwanted hazing has not been reported, even in high-impact molding compositions.

EXAMPLES

EXAMPLE A pentaerythritol succinate stearate (7:6:14)

71.4 g (0.525 mole) pentaerythritol and 283.5 g (1.05 mole) technical stearic acid were heated with stirring for 30 minutes in a light vacuum to a temperature of 210° C. in the presence of 0.2 g tin powder. After reduction of the pressure to 12 mbar, the mixture was kept at 200° to 210° C. for 3 hours. The mixture was then cooled to 100° C. before 53.1 g (0.45 mole) succinic acid and 0.2 g tin powder were added. The mixture was then heated for 4 hours to 200°-210° C., while the pressure was slowly reduced to 19 mbar during the first 2 hours and thereafter kept at that value. Bleaching earth was then added to the reaction mixture, followed by filtration under pressure at 90° C. After cooling, the pentaerythritol succinate stearate (7:6:14) (material A; 304 g) was present as a yellowish, slightly brittle, wax-like mass (dropping point 55.1° C.; acid number 2.3; saponification number 281.5; hydroxyl number 24.9).

EXAMPLE B pentaerythritol adipate stearate (7:6:14)

As in Example A, 71.4 g (0.525 mole) pentaerythritol and 283.5 g (1.05 mole) stearic acid were reacted for 3 hours at 200°-210° C. in the presence of 0.2 g tin powder. 65.7 g (0.45 mole) adipic acid and 0.2 g tin powder were then added to the reaction mixture before it was heated for 5.5 hours to 200°-210° C. The pressure was slowly reduced to 24 mbar during the first 90 minutes and thereafter was kept at that value. After filtration under pressure and cooling, the pentaerythritol adipate stearate (7:6:14) (material B; 372 g) was present as a yellowish, brittle, wax-like mass (dropping point 53.2° C.; acid number 2.1; saponification number 286.4; hydroxyl number 22).

EXAMPLE C pentaerythritol adipate behenate (7:6:12)

Following the procedure of Example A, 78.2 g (0.575 mole) pentaerythritol and 335.3 g (0.986 mole) behenic acid were reacted for 2 hours at 200° to 210° C. in the presence of 0.25 g tin powder. 72.0 g (0.49 mole) adipic acid and 0.25 g tin powder were then added to the reaction mixture before it was heated for another 2 hours to 210° C. in an increasing vacuum (final pressure 10 to 20 mbar). After filtration under pressure and cooling, the pentaerythritol adipate behenate (7:6:12) (material C; 345 g) was present as a pale yellowish, slightly brittle, wax-like mass (dropping point 70.0° C.; acid number 0.92; saponification number 230.1; hydroxyl number 40.6).

EXAMPLE D pentaerythritol adipate stearate behenate (7:6:7:7)

As in Example C, 73.3 g (0.539 mole) pentaerythritol, 145.5 g (0.539 mole) technical stearic acid, and 183.2 g (0.539 mole) technical behenic acid were reacted in a first step, and 67.4 g (0.46 mole) adipic acid was reacted in a second step, using 0.25 g tin powder as catalyst in each step. The pentaerythritol adipate stearate behenate obtained (7:6:7:7) (material D; 410 g) was a pale yellowish, slightly brittle, wax-like mass (dropping point 60.8° C.; acid number 1.3; saponification number 257.5; hydroxyl number 19.2).

EXAMPLE E pentaerythritol adipate stearate behenate (7:6:7:6)

As in Example D, 95.2 g (0.7 mole) pentaerythritol, 189.0 g (0.7 mole) technical stearic acid, 204.0 g (0.6 mole) technical behenic acid and 87.6 g (0.6 mole) adipic acid were reacted using 2 portions of 0.3 g each tin powder as catalyst. The pentaerythritol adipate stearate behenate obtained (7:6:7:6) (material E; 476 g) was a yellow-tinged, brittle wax-like mass (dropping point 59.8° C.; acid number 0.66; saponification number 260.2; hydroxy number 30.0).

EXAMPLE F pentaerythritol adipate stearate behenate (7:6:6:6)

As in Example D, 95.2 g (0.7 mole) pentaerythritol, 162.0 g (0.6 mole) technical stearic acid, 204.0 g (0.6 mole) technical behenic acid and 87.6 g (0.6 mole) adipic acid were reacted using 2 portions of 0.25 g each tin powder as catalyst. The pentaerythritol adipate stearate behenate (7:6:6:6) (material F; 447 g) was obtained in the form of a yellow-tinged, brittle wax-like mass (dropping point 59.4° C.; acid number 0.30; saponification number 263.9; hydroxyl number 41.1).

EXAMPLE G pentaerythritol adipate stearate behenate (7:6:6.5:6.5)

As in Example D, 92.5 g (0.7 mole) pentaerythritol, 175.5 g (0.65 mole) technical stearic acid, 221.0 g (0.65 mole) technical behenic acid and 87.6 g (0.6 mole) adipic acid were reacted using 2 portions of 0.3 g each tin powder as catalyst. The pentaerythritol adipate stearate behenate (7:6:6.5:6.5) (material G; 477 g) was obtained in the form of a pale yellowish, brittle waxlike mass (dropping point 59.1° C; acid number 0.78; saponification number 262.0; hydroxyl number 32.3).

EXAMPLE H glycerol adipate stearate (8:7:9)

88 g (0.96 mole) glycerol, 121 g (0.83 mole) adipic acid, 290 g (1.07 mole) technical stearic acid, 0.5 g tin powder and 0.5 g $H_3PO_3$ were heated for 4.5 hours to 200°-210° C., initially under normal pressure. After 30 minutes' heating, a slight vacuum was applied; in the course of the next 2 hours, the pressure was reduced to 13 mbar and thereafter was kept at that value for 2 hours. After the addition of bleaching earth, the yellowish, clear reaction mixture was subjected to pressure filtration at 90° C. After cooling, the glycerol adipate stearate (8:7:9) (material H; 403 g) was present as a whitish, wax-like mass (dropping point 40.8° C.; acid number 7.1; saponification number 340.1; hydroxyl number 25.1).

EXAMPLE I pentaerythritol adipate stearate (8:7:17)

As in Example A, 76.2 g (0.56 mole) pentaerythritol and 321.3 g (1.19 mole) technical stearic acid were reacted for 2 hours at 200° to 210° C. in the presence of 0.25 g tin powder. After the addition of 71.5 g (0.49 mole) adipic acid and 0.25 g tin powder, the reaction mixture was heated for another 16 hours to 200°-210° C. under a pressure of from 15 to 16 mbar. After the addition of bleaching earth, filtration under pressure at 90° C. and cooling, the pentaerythritol adipate stearate (8:7:17) (material I; 367 g) was present as a yellow-tinged, brittle, wax-like mass (dropping point 55.0° C.; acid number 6.9; saponification number 281.1; hydroxyl number 15.9).

EXAMPLE J glycerol adipate stearate hydroxystearate (8:7:9:1)

74.5 g (0.8 mole) glycerol and 243.0 g (0.9 mole) technical stearic acid were reacted for 2 hours at 195° to 200° C. in the presence of 0.3 g tin powder. In the course of the first hour, the pressure was slowly and continuously reduced to around 70 mbar and thereafter was left at that level. After the addition of 102.2 g (0.7 mole) adipic acid and 0.3 g tin powder, the reaction mixture was kept at 195°–200° C. for 3 hours under decreasing pressure (final value 17 mbar). 31.2 (0.1 mole) technical hydroxystearic acid and another 0.3 g tin powder were then added before the reaction mixture was heated for another 3 hours to 195°–200° C. The pressure was reduced to 13–16 mbar during the first 30 minutes and thereafter was kept at that level. After the addition of bleaching earth, filtration under pressure at 90° to 100° C. and cooling, the glycerol adipate stearate hydroxystearate (8:7:9:1) (material J; 384 g) was present as a yellow brown-tinged wax-like mass (dropping point 48.0° C.; acid number 7.9; saponification number 327.3; hydroxyl number 20.1).

EXAMPLE K pentaerythritol adipate stearate hydroxystearate (8:7:17:1)

As in Example J, 70.7 g (0.52 mole) pentaerythritol instead of glycerol, 298.4 g (1.105 moles) technical stearic acid, 66.4 g (0.455 mole) adipic acid and 20.3 g (0.065 mole) technical hydroxystearic acid were reacted using a total of 0.5 g tin powder as catalyst. After filtration under pressure at 90° C. in the presence of bleaching earth and cooling, the pentaerythritol adipate stearate hydroxystearate (8:7:17;1) (material K; 355 g) was present as a pale yellowish, brittle, wax-like mass (dropping point 54.7° C.; acid number 5.8; saponification number 276.6; hydroxyl number 12.2).

EXAMPLE L pentaerythritol adipate stearate hydroxystearate (8:7:16:1)

As in Example K, 76.2 g (0.56 mole) pentaerythritol, 302.4 g (1.12 moles) technical stearic acid, 71.5 g (0.49 mole) adipic acid and 21.8 g (0.07 mole) technical hydroxystearic acid were reacted using a total of 1.0 g tin powder as catalyst. After filtration under pressure at 90° C. in the presence of bleaching earth, followed by cooling, the pentaerythritol adipate stearate hydroxystearate (8:7:16:1) (material L; 363 g) was present as a yellowish, brittle, wax-like mass (dropping point 54.2° C.; acid number 2.3; saponification number 281.5; hydroxyl number 22.0).

EXAMPLE M pentaerythritol adipate stearate hydroxystearate (7:6:12:3)

95.2 g (0.7 mole) pentaerythritol and 324.0 g (1.2 moles) technical stearic acid were reacted for 2 hours at 205°–210° C. in the presence of 0.3 g tin powder. The pressure was continuously reduced to 10–20 mbar and, finally, was kept at that level. After the addition of 87.6 g (0.6 mole) adipic acid and 0.15 g tin powder, the reaction mixture was heated for another 2 hours to 205°–210° C. under decreasing pressure (final vacuum 10–20 mbar). 93.6 g (0.3 mole) technical hydroxystearic acid and another 0.15 g tin powder were then added before the reaction mixture was heated for another 2 hours to 205°–210° C. The pressure was continuously reduced to a final vacuum of 10 to 15 mbar. After the addition of bleaching earth, filtration under pressure at 90° C. and cooling, the pentaerythritol adipate stearate hydroxystearate (7:6:12:3) (material M; 482 g) was present as a yellowish, slightly brittle, wax-like, slightly caking mass (dropping point 51.5° C.; acid number 1.06; saponification number 277.5; hydroxyl number 43.2).

EXAMPLE N pentaerythritol adipate tartrate stearate (7:5:1:16)

66.6 g (0.49 mole) pentaerythritol and 302.4 g (1.12 moles) technical stearic acid were reacted for 1.5 hours at 195° to 205° C. in the presence of 0.2 g tin powder. The pressure was continuously reduced to 12 mbar and was kept at that level for the rest of the reaction time. 51.5 g (0.35 mole) adipic acid and another 0.2 g tin powder were then added before the mixture was heated for another 2.5 hours to 195°–205° C. under a pressure of 16 mbar. The reaction mixture was cooled to 150° C. After the addition of 10.5 g (0.07 mole) tartaric acid, the mixture was continuously heated from 150° C. to 185° C. over a period of 2.5 hours, during which the pressure was gradually reduced to a final vacuum of 13 mbar. After filtration under pressure at 90° C. to 100° C. in the presence of bleaching earth, followed by cooling, the pentaerythritol adipate tartrate stearate (7:5:1:16) (material N; 328 g) was present as a yellowish, brittle wax-like mass (dropping point 56.4° C.; acid number 3.0; saponification number 271.3; hydroxyl number 18.7).

EXAMPLE O pentaerythritol adipate hydroxysuccinate stearate (7:4:2:16)

As in Example N, 66.6 g (0.49 mole) pentaerythritol, 302.4 g (1.12 moles) technical stearic acid, 40.9 g (0.28 mole) adipic acid and 18.8 g (0.14 mole) hydroxysuccinic acid (malic acid) instead of tartaric acid were reacted in a three-step reaction using 0.4 g tin powder. After the addition of bleaching earth, filtration under pressure at 80° C. to 90° C. and cooling, the pentaerythritol adipate hydroxysuccinate stearate (7:4:2:16) (material O; 332 g) was present as a yellowish, brittle, wax-like mass (dropping point 56.2° C.; acid number 4.8; saponification number 256.8; hydroxyl number 30.7).

EXAMPLE P pentaerythritol adipate stearate dimethylolpropionate (7:6:15:1)

As in Example N, 66.6 g (0.49 mole) pentaerythritol, 283.5 g (1.05 moles) technical stearic acid, 61.3 g (0.42 mole) adipic acid and 9.4 g (0.07 mole) dimethylolpropionic acid instead of tartaric acid were reacted in three steps using 0.4 g tin powder and 0.2 g $H_3PO_4$. After the addition of bleaching earth, filtration under pressure at 90° C., and cooling, the pentaerythritol adipate stearate dimethylolpropionate (7:6:15:1) (material P; 350 g) was present as a yellowish, brittle wax-like mass (dropping point 54.9; acid number 3.6; saponification number 285.2; hydroxyl number 25.0).

EXAMPLE Q pentaerythritol adipate stearate dimethylolpropionate (8:7:16:1)

As in Example N, 76.2 g (0.56 mole) pentaerythritol, 302.4 g (1.12 mole) technical stearic acid, 71.5 g (0.49 mole) adipic acid and 9.4 g (0.07 mole) dimethylolpropionic acid instead of tartaric acid were reacted in three steps using a total of 1.0 g tin powder. After the addition of bleaching earth, filtration under pressure at 90° C. and cooling, the pentaerythritol adipate stearate dimethylolpropionate (8:7:16:1) (material Q; 364 g) was present as a yellowish, brittle wax-like mass (dropping point 52.8° C.; acid number 2.7; saponification number 289.0; hydroxyl number 28.0).

EXAMPLE R pentaerythritol adipate stearate dimethylolpropionate (8:7:17:1)

As in Example N, 70.7 g (0.52 mole) pentaerythritol, 298.4 g (1.105 mole) technical stearic acid, 66.4 g (0.455 mole) adipic acid and 8.7 g (0.065 mole) dimethylolpropionic acid instead of tartaric acid were reacted in three steps using a total of 1.0 g tin powder. After the addition of bleaching earth, filtration under pressure at 90° C. and cooling, the pentaerythritol adipate stearate dimethylolpropionate (8:7:17:1) (material R; 355 g) was present as a yellowish, brittle wax-like mass (dropping point 55.0° C.; acid number 2.5; saponification number 285.7; hydroxyl number 23.5).

In Examples 1 to 8 infra Hoechst-Wachs E ("material X") was used as a comparison standard. Hoechst-Wachs E, an ethylene glycol ester of montanic acid, is a product of Hoechst-Aktiengesellschaft, Verkauf Kunststoffe. Gruppe Wachse und Kunststoff-Additive, Gersthofen, Augsburg, Germany.

EXAMPLE 1

A basic formulation (BF1) for PVC molding compositions was prepared by mechanically mixing the following individual constituents (pbw=parts by weight):

| BASIC FORMULATION BF1 | |
|---|---|
| 100 | pbw suspension PVC; K-value 60 (Vinol ® H 60 DS) |
| 1.5 | pbw dioctyl tin mercaptide (Irgastab ® 17 MOK) |
| 10 | pbw high impact modifier based on a methacrylate/butadiene/styrene copolymer (Kane ® ACE B-28) |
| 1.0 | pbw flow modifier based on methacrylate (Paraloid ® K 125) |
| 1.0 | pbw glycerol dioleate |

TACK-FREE TEST

To determine the tack-free time, the molding composition was processed on laboratory mixing rolls to form film sheets, of which the rolls had a bowl width of 450 mm for a bowl diameter of 220 mm (manufacturer: Berstorff), at a roll temperature of 185° C. and at a roll speed of 12.5 r.p.m. (co-rotating rolls). The test sheet was regularly turned during formation.

A. 0.1 pbw material A from Example A was incorporated into the basic formulation BF1 to form a molding composition. The molding composition was processed in the tack-free test for 65 minutes before it was observed to stick to the rolls.

B. Another molding composition was prepared from the same basic formulation BF1 by incorporation of 0.1 pbw material B from Example B to 100 pbw polymer. In the tack-free test to determine tack-free time, this molding composition was processed for 55 minutes before the test sheet was observed to stick to the rolls.

C. Comparison. For comparison purposes, material X was incorporated in the basic formulation BF1 in a quantity of 0.1 pbw to 100 pbw polymer. The same tack-free test procedure was followed for this molding composition. In this case, the test sheet stuck fast to the roll after only 25 minutes.

EXAMPLE 2

A basic formulation (BF2) for PVC molding compositions was prepared by mechanically mixing the following individual constituents:

| BASIC FORMULATION BF2 | |
|---|---|
| 100 | pbw suspension PVC, K-value 60 (Vinol ® H 60 DS) |
| 1.5 | pbw dioctyl tin mercaptide (Irgastab ® 17 MOK) |
| 1.0 | pbw glycerol dioleate |

Materials A, B and X were incorporated in portions of this basic formulation in quantities of 0.1 pbw to 100 pbw polymer as described in Example 1. The tack-free time of the PVC molding compositions obtained, determined under the "Tack-free Test" conditions described in Example 1, was 55 minutes for materials A and B and 25 minutes for material X.

EXAMPLE 3

Materials A, B, N, O and P were incorporated in portions of the basic formulation BF1 for PVC molding compositions, according to Example 1, each in quantities of 0.3, 0.4 and 0.5 pbw to 100 pbw polymer.

To determine the tack-free time, the molding compositions obtained were treated on laboratory mixing rolls at 200° C. in the "Tack-free Test" as described in Example 1. The results obtained are shown in Table 1 below.

TRANSPARENCY TEST

To test transparency, 4 mm thick molded plates were prepared from the PVC molding compositions obtained and their transparency determined as a percent, using air as reference standard. A standard transparency measuring apparatus "Dr. Lange Transparenzmeßgerät" made by Dr. Bruno Lange GmbH, Neuß, was used for the reported measurements which were carried out by the absorption method. The results of the transparency measurements are also shoen in Table I.

TABLE I

| Material | Tack-free time (mins.) | | | Transparency (% against air) | | |
|---|---|---|---|---|---|---|
| | 0.3 | 0.4 | 0.5 | 0.3 | 0.4 | 0.5 |
| A | 18 | 22 | 26 | 59 | 52 | 48 |
| B | 22 | 20 | 22 | 56 | 47 | 50 |
| N | 20 | — | 24 | 57 | — | 49 |
| O | 22 | — | 24 | 55 | — | 50 |
| P | 26 | — | 30 | 56 | — | 51 |
| X | 18 | 18 | 18 | 59 | 58 | 57 |

EXAMPLE 4

Materials A, B, N, O, P and X were incorporated in portions of the basic formulation BF2 according to Example 2, each in quantities of 0.3, 0.4 and 0.5 pbw to 100 pbw polymer.

To determine the tack-free time, the molding composition portions obtained were treated on laboratory mixing rolls at 200° C. according to the "Tack-free Test" described in Example 1. The results obtained are shown in Table II below.

In addition, the molding composition portions obtained were molded to form 4 mm thick plates and the transparency of the plates determined according to the "Transparency Test" described in Example 3. The results of the transparency measurements are also shown in Table II.

TABLE II

| Material | Tack-free time (mins.) | | | Transparency (% against air) | | |
|---|---|---|---|---|---|---|
| | 0.3 pbw | 0.4 pbw | 0.5 pbw | 0.3 pbw | 0.4 pbw | 0.5 pbw |
| A | 22 | 26 | 28 | 78 | 73 | 69 |
| B | 22 | 28 | 26 | 81 | 77 | 71 |
| N | 22 | 28 | 76 | — | 58 | |
| O | 22 | 28 | 77 | — | 60 | |
| P | 20 | 28 | 80 | — | 70 | |
| X | 14 | 22 | 24 | 40 | 34 | 46 |

EXAMPLE 5

Materials C, D, E, F, G, M and X were incorporated in portions of the basic formulation BF1, according to Example 1, each in quantities of 0.3, 0.4 and 0.5 pbw to 100 pbw polymer.

The tack-free time and the transparency of the PVC molding composition portions obtained were determined according to the Tack-free Test and Transparency Test (Examples 1 and 3). The results obtained are shown in Table III below.

TABLE III

| Material | Tack-free time (mins.) | | | Transparency (% against air) | | |
|---|---|---|---|---|---|---|
| | 0.3 pbw | 0.4 pbw | 0.5 pbw | 0.3 pbw | 0.4 pbw | 0.5 pbw |
| C | 6 | 10 | 10 | 62 | 59 | 56 |
| D | 14 | 14 | 20 | 60 | 58 | 55 |
| E | 16 | 18 | 20 | 60 | 57 | 55 |
| F | 12 | 14 | 16 | 61 | 5B | 57 |
| G | 10 | 14 | 24 | 61 | 59 | 57 |
| M | 18 | 20 | 26 | 60 | — | 56 |
| X | 4 | 4 | 6 | 62 | 60 | 58 |

EXAMPLE 6

Materials C, D, E, F, G, M and X were incorporated in portions of the basic formulation BF2 according to Example 2, each in quantities of 0.3, 0.4 and 0.5 pbw to 100 pbw polymer.

The tack-free time and transparency of the PVC molding composition portions prepared in this way were determined according to the "Tack-free" and "Transparency" test conditions described in Examples 1 and 3. The results obtained are shown in Table IV below.

TABLE IV

| Material | Tack-free time (mins.) | | | Transparency (% against air) | | |
|---|---|---|---|---|---|---|
| | 0.3 pbw | 0.4 pbw | 0.5 pbw | 0.3 pbw | 0.4 pbw | 0.5 pbw |
| C | 24 | 26 | 28 | 77 | 66 | 57 |
| D | 24 | 26 | 26 | 81 | 76 | 68 |
| E | 22 | 24 | 26 | 82 | 78 | 73 |
| F | 22 | 22 | 24 | 82 | 79 | 75 |
| G | 22 | 24 | 28 | 82 | 78 | 73 |
| M | 20 | 24 | 28 | 82 | 79 | 75 |
| X | 12 | 20 | 26 | 54 | 25 | 6 |

EXAMPLE 7

Materials H, I, J, K, L, P, Q, R and X were incorporated in portions of the basic formulation BF1, according to Example 1, each in quantities of 0.2 and 0.5 pbw to 100 pbw polymer.

The tack-free time of the PVC molding compositions prepared in this way was determined under the "Tack-free" test conditions described in Example 1. In addition, the transparency of the molding compositions which contained 0.5 pbw of the materials mentioned to 100 pbw polymer was determined under the "Transparency" test conditions as described in Example 3. The results obtained are shown in Table V below.

TABLE V

| Material | Tack-free time (mins.) | | Transparency (% against air) |
|---|---|---|---|
| | 0.2 pbw | 0.5 pbw | 0.5 pbw |
| H | 14 | 24 | 50 |
| I | 20 | 32 | 42 |
| J | 14 | 28 | 49 |
| K | 22 | 28 | 43 |
| L | 28 | 28 | 43 |
| P | 18 | 30 | 43 |
| Q | 22 | 28 | 44 |
| R | 12 | 30 | 43 |
| X | 10 | 20 | 52 |

EXAMPLE 8

Materials H, I, J, K, L, P, Q, R and X were incorporated in portions of the basic formulation BF2, according to Example 2, each in quantities of 0.2 pbw and 0.5 pbw to 100 pbw polymer.

The tack-free time of the molding compositions obtained was determined under the "Tack-free" test conditions described in Example 1. In addition, the transparency of the molding composition portions, which each contained 0.5 pbw of one of the lubricant materials H through X to 100 pbw polymer, was determined in the same way as described above. The results of the tests are shown in Table VI below.

TABLE VI

| Material | Tack-free time time (mins.) | | Transparency (% against air) |
|---|---|---|---|
| | 0.2 pbw | 0.5 pbw | 0.5 pbw |
| H | 10 | 20 | 77 |
| I | 26 | 32 | 69 |
| J | 24 | 32 | 76 |
| K | 32 | 30 | 68 |
| L | 26 | 30 | 72 |
| P | 28 | 39 | 68 |
| Q | 28 | 30 | 73 |
| R | 26 | 30 | 69 |
| X | 12 | 26 | 11 |

APPENDIX

The sources of the trademark products herein is as follows: Vinol® H 60 DS is a product of Wacker-Chemie GmbH, Munich, Germany.

Irgastab® 17 MOK is a product of Ciba-Geigy Marienberg GmbH, Marienberg, Germany.

Kane® ACE B-28 is a product of Kaneka Belgium N.V., Brussels, Belgium.

Paraloid® K-125 is a product of Rohm & Haas Deutschland GmbH, Frankfurt/Main, Germany.

We claim:

1. A method for lubricating a molding composition of a thermoplastic polymer comprising incorporating into the composition a sufficient amount of at least one hydroxyl-containing mixed ester comprising the reaction product of the following reactants (a), (b), and (c):
   a) an aliphatic, cycloaliphatic, or aromatic $C_2$–$C_{22}$-dicarboxylic acid containing up to 2 hydroxyl groups, or a mixture thereof, wherein at least one dicarboxylic acid comprising this component a) contains at least one hydroxyl group;
   b) an aliphatic polyol containing from 3 to 6 hydroxyl groups, or a mixture thereof; and
   c) an aliphatic $C_2$–$C_{32}$-monocarboxylic acid containing up to 2 hydroxyl groups, or a mixture thereof; wherein the molar ratio of reactants (a) and (b) is about $n-1$: $n$, wherein $n$ is an integer of from 6 to 15; and reactant (c) is selected for functional group content and quantity so that, as a product average, at least one free hydroxyl group is present per molecule of mixed ester, to provide the polymer with effective release properties.

2. A method for lubricating a molding composition of a thermoplastic polymer comprising incorporating into the composition a sufficient amount of at least one, hydroxylcontaining mixed ester comprising the reaction product of the following reactants (a), (b), and (c):
   a) an aliphatic, cycloaliphatic, or aromatic $C_2$–$C_{22}$-dicarboxylic acid containing up to 2 hydroxyl groups, or a mixture thereof;
   b) an aliphatic polyol containing from 3 to 6 hydroxyl groups, or a mixture thereof; and
   c) an aliphatic $C_2$–$C_{32}$-monocarboxylic acid containing up to 2 hydroxyl groups, or a mixture thereof, wherein at least one monocarboxylic acid comprising this component c) contains at least one hydroxyl group;
wherein the molar ratio of reactants (a) and (b) is about $n-1$: $n$, wherein $n$ is an integer of from 6 to 15; and reactant (c) is selected for functional group content and quantity so that, as a product average, at least one free hydroxyl group is present per molecule of mixed ester, to provide the polymer with effective release properties.

3. In a thermoplastic polymer molding composition of the type adapted to be molded into a predetermined shape, the improvement comprising incorporating a sufficient amount of at least one, hydroxyl-containing mixed ester comprising the reaction product of the following reactants (a), (b), and (c):
   a) an aliphatic, cycloaliphatic, or aromatic $C_2$–$C_{22}$-dicarboxylic acid containing up to 2 hydroxyl groups, or a mixture thereof, wherein at least one dicarboxylic acid comprising this component a) contains at least one hydroxyl group;
   b) an aliphatic polyol containing from 3 to 6 hydroxyl groups, or a mixture thereof; and
   c) an aliphatic $C_2$–$C_{32}$-monocarboxylic acid containing up to 2 hydroxyl groups, or a mixture thereof;
wherein the molar ratio of reactants (a) and (b) is about $n-1$: $n$, wherein $n$ is an integer of from 6 to 15; and reactant (c) is selected for functional group content and quantity so that, as a product average, at least one free hydroxyl group is present per molecule of mixed ester, to promote release of the composition from a molding form.

4. In a thermoplastic polymer molding composition of the type adapted to be molded into a predetermined shape, the improvement comprising incorporating a sufficient amount of at least one, hydroxyl-containing mixed ester comprising the reaction product of the following reactants (a), (b), and (c):
   a) an aliphatic, cycloaliphatic, or aromatic $C_2$–$C_{22}$-dicarboxylic acid containing up to 2 hydroxyl groups, or a mixture thereof; and
   b) an aliphatic polyol containing from 3 to 6 hydroxyl groups, or a mixture thereof; and
   c) an aliphatic $C_2$–$C_{32}$-monocarboxylic acid containing up to 2 hydroxyl groups, or a mixture thereof, wherein at least one monocarboxylic acid comprising this component c) contains at least one hydroxyl group;
wherein the molar ratio of reactants (a) and (b) is about $n-1$: $n$, wherein $n$ is an integer of from 6 to 15; and reactant (c) is selected for functional group content and quantity so that, as a product average, at least one free hydroxyl group is present per molecule of mixed ester, to promote release of the composition from a molding form.

5. The method of claim 1 wherein the free hydroxyl groups present in the at least one mixed ester are at least predominantly derived from the hydroxyl-containing reactant (a) dicarboxylic acid.

6. The method of claim 2 wherein the free hydroxyl groups present in the at least one mixed ester are at least predominantly derived from the hydroxyl-containing reactant (c) monocarboxylic acid.

7. The composition of claim 3 wherein the free hydroxyl groups present in the at least one mixed ester are at least predominantly derived from the hydroxyl-containing reactant (a) dicarboxylic acid.

8. The composition of claim 3 wherein the free hydroxyl groups present in the at least one mixed ester are at least predominantly derived from the hydroxyl-containing reactant (c) monocarboxylic acid.

* * * * *